Patented Jan. 6, 1931

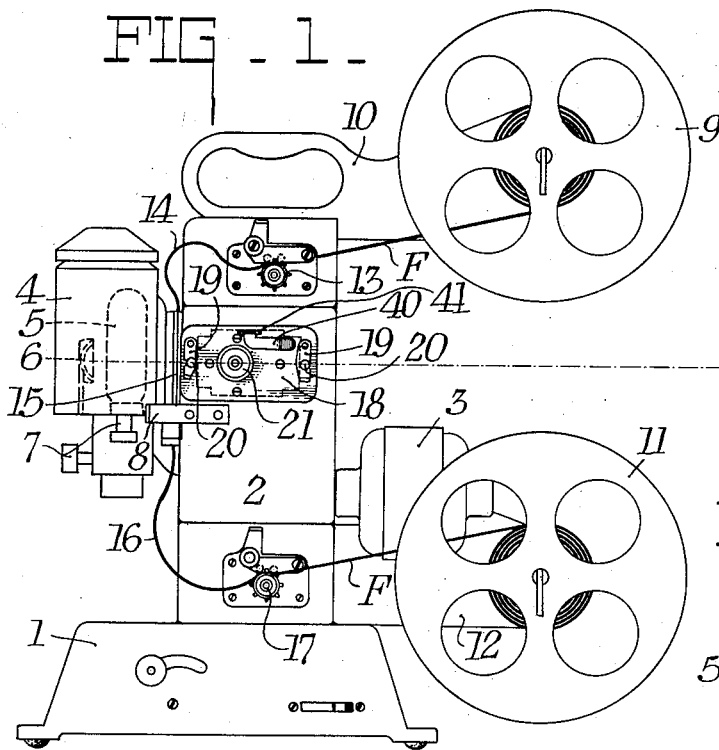

1,787,808

UNITED STATES PATENT OFFICE

OTTO WITTEL, OF ROCHESTER, NEW YORK, ASSIGNOR TO EASTMAN KODAK COMPANY, OF ROCHESTER, NEW YORK, A CORPORATION OF NEW YORK

OPTICAL SYSTEM FOR PHOTOGRAPHIC APPARATUS

Application filed September 4, 1928. Serial No. 303,777.

This invention relates to photography and more particularly to optical systems for photographic apparatus, such as cameras and projectors. One object of my invention is to provide an optical system which is suitable for use on standard projectors for color photography. Another object is to provide an optical system which is self-contained and which is protected against dust. Another object is to provide an optical system in which the lens elements may be moved relative to each other for focusing and for positioning the optical element in the motion picture apparatus, and other objects will appear hereinafter from the following specification, the novel features being particularly pointed out in the claims at the end thereof.

In certain natural color motion picture photography it is necessary to have the taking lens and the projecting lens bear a definite relation to each other. Where the projection lens is of greater focal length than the taking lens, some form of compensator must be employed in the optical system. This forms the subject matter of this invention. A compensator is built into an optical unit so as to form a part of the objective and one which is suitable for use on a standard type of motion picture machine.

Coming now to the drawings, wherein like reference characters denote like parts throughout,—

Fig. 1 is a side elevation of a typical projector equipped with an optical system constructed in accordance with and embodying a preferred form of my invention;

Fig. 2 is an enlarged plan view of the optical system used in the projector in Fig. 1, parts being shown in section;

Fig. 3 is an end elevation of the optical system shown in Fig. 2;

Fig. 4 is a detailed view of the color screen and screen holder; and

Fig. 5 is a fragmentary detail, in section, showing the objective focusing mechanism.

In Figure 1 a typical projector is shown as consisting of a base 1 having an upright housing 2 enclosing the film-moving mechanism of the projector, which may be driven in a suitable manner, as by a motor 3. A lamp house 4 is mounted on the housing 2 and is provided with a lamp 5, reflector 6, lamp-adjusting screws 7 and a latch 8, which may hold the lamp house in an operative position.

A film supply reel 9 may be mounted on an arm 10 and a film take-up reel 11 may be mounted upon an arm 12. The film F can be drawn from the supply reel 9 by a sprocket 13 after which it passes from a loop 14 through a film gate 15 into a second loop 16 and thence is moved by a sprocket 17 toward the take-up reel 11.

The projector objective is preferably carried upon a support, here shown in the form of a flat plate 18 equipped with latches 19, which may engage studs 20 to hold the plate to the side of the housing 2. A knob 21 may be used to focus the objective.

As thus far described, the mechanism of the projector is all standard practice and is described by way of illustration only as my invention may be applied to different types of projectors.

Coming now to my invention, it is important with certain systems of color photography to provide an objective for projecting pictures which has a definite relation to the objective used for taking them. Such a system is described in French Patent No. 573,508, Societe Du Film K. D. V. delivre March 12, 1924.

In the present instance the plate 18 is provided with a support 22 having two arms 23 in which bearings 24 are provided for a tubular member 25 which may be slid in its bearings by the eccentric stud 26, which engages a slot 27 in a wall of the tube, as best shown in Fig. 5. Stud 26 is carried by shaft 26', which may be turned by knob 21, which extends outside of the plate 18.

The tube 25 contains a plurality of lens elements, here shown as 28ª and 28. In the objective shown in the drawings, each of these elements is formed from two cemented lenses, although obviously any type of projection lens desirable may be employed. These two elements are mounted fixedly in the tube 25 and may be moved in the manner described by knob 21 for focusing.

In order to compensate for the difference between the taking and projecting lenses, a third lens element 29 is employed, in the present instance this lens element taking the form of a weak negative lens. Element 29 is mounted in a tubular support 30 having a threaded engagement at 31 with a tube 32. A collar 33 is held between these tubes and this collar is carried upon a pair of arms 34 mounted to slide freely through apertures 35 in the support 22.

One of these arms 34 may be moved by a lever 36 through a pin 37 and slot 38 connection between the arm and the lever. Lever 36 may turn upon a stud 39 when actuated by a handle 40, which projects out through an opening 41 in the plate 18, so as to be accessible outside of the projector.

Lever 36 is spring held at either extent of its movement in the following manner: There is a formed-up end 136 on the lever spring pressed against the curved face 125 of the tubular member 25, so that as the lever is moved, it rocks over this curved face along the broken line L. If desired, the point 136 may drop into small depressions 137 in the tubular member 25, and thus latch the parts in predetermined positions, but the action of the spring over the curved surface 125 is sufficient to normally retain the lever in an operative position, as shown in Fig. 2, in which the compensating lens 29 lies close to the film F, or in an inoperative position in which the lens elements lie as close together as possible so that the optical system may be moved as a unit through the opening 49 in wall 50 of the projector housing.

Tube 32 has a flange 42 slidably mounted on the inside of a tubular member 43, this tubular member having a flange 44 on one end for limiting the outward movement of tube 32 and having a flange 45 on the inner end for limiting the movement of tube 43 relative to tube 25. Thus tubes 32 and 43 may be made to telescope more or less, so that the lens element 29 may be moved to and from the lens elements 28ª and 28, so that the total length of the optical system can be greatly reduced when necessary to remove the system from the housing 2 through an opening 49.

It should be noted that all of the lens elements are movably mounted with respect to the support 22,—that is, lens elements 28ª and 28 may be moved for focusing the objective by turning the knob 21 and lens element 29 may be moved to and from the other lens elements by operating the lever 40.

After inserting the optical system, which has been previously telescoped as far as possible to the opening 49 of the housing wall 50, lever 40 is moved in the direction shown by the arrow. Fig. 2, so as to thrust rods 34 to the left in this figure and to cause lens element 29 to come in contact with or lie close to the film gate 15, through which the film F passes in projecting pictures. Figure 2 shows the parts in an operative or projecting position and in this picture the objective is focused on a close object with the focusing mechanism in the position indicated in Fig. 5.

On the end of tube 24 there is a color filter designated broadly as C and, as shown in Fig. 4, this filter preferably consists of a filter element comprising a ring 52 in which there is fixedly mounted a plurality of color bands forming a screen, these bands preferably being red, as indicated at R, green, as indicated at G, and blue, as indicated at B. The ring 52 is provided with a notch 53, which is adapted to lie in contact with and be positioned by a lug 154 on the tubular member 25. This of course, locates the position of the color filters with respect to the film. In order to hold the filter element in place, an annular member 54 having a flange threaded at 55 is screwed on to the thread 56, an overhanging flange 57 on the annular member being adapted to engage and hold the ring 52 with its filter bands in place.

The optical system above described may be furnished as a unit to equip projectors for color photography or may form a part of projectors sold for that purpose. In either event, when it is desired to project the usual black and white pictures, it is only necessary to remove the system by releasing the latches 19, so that the color filter C may be removed by unscrewing the annular member 54. The compensating lens 29 does not noticeably affect the projection of black and white pictures, but it is necessary for colored pictures, so that it may be left in place all the time.

It should be noted that the optical system above described is provided with a series of inner engaging tubular members which effectually keep dust, dirt and oil from coming in contact with the inner surfaces of the lens elements and it is only necessary to occasionally clean the two outermost exposed surfaces to keep the objective in operating condition.

While I have described and illustrated a preferred embodiment of my invention, it is obviously susceptible of other embodiments and I contemplate as within the scope of my invention any such forms as may come within the terms of the appended claims.

Having thus described my invention, what I claim as new and desire to secure by Letters Patent is:

1. In an optical system, the combination with a fixed mount, adapted to be attached to an apertured wall of a motion picture machine, an objective movably carried for focusing by the mount when passed through the apertured wall, a compensating lens carried by the objective and being movably mounted thereon, and means carried by the mount for moving the compensating lens to and from the objective whereby the optical system may be passed through the apertured wall.

2. In an optical system, the combination with a fixed mount, of an objective movably carried by the mount, a compensating lens for the objective, and means carried by the mount for moving the compensating lens to and from the objective, said means comprising a spring lever extending through and engaging said mount, whereby said lever tends to hold the compensating lens in a set position.

3. In an optical system, the combination with a fixed mount, of an objective movably carried by the mount, a compensating lens for the objective, and means carried by the mount for moving the compensating lens to and from the objective, said means comprising a spring lever extending through and engaging said mount, a latch between the spring lever and mount adapted to hold the compensating lens in a fixed position with respect to the mount.

4. In an optical system, the combination with a fixed mount adapted to be attached to an apertured wall of a motion picture machine including a film gate, of an objective movably carried in the mount for focusing when passed through the apertured wall, a compensating lens carried by the fixed mount, means for moving said compensating lens independently of the objective, said means including an arm by which said compensating lens may be moved toward said film gate into an operative position and by which said lens may be moved away from said film gate into an inoperative position permitting said fixed mount to be removed from the motion picture apparatus.

5. In an optical system, the combination with a fixed mount adapted to be attached to an apertured wall of a motion picture machine, of an objective adapted to be moved by the mount into a position in which it may pass a picture to a film in the motion picture apparatus, a compensating lens carried by said fixed mount, a slidable support for said compensating lens on which it may be slid to and from an operative position with respect to the motion picture machine, and an arm carried by the fixed mount for moving the lens element towards the objective to permit the removal of the mount from the motion picture machine.

6. In an optical system, the combination with a fixed mount adapted to be attached to a wall of a motion picture machine, of an objective adapted to be moved in the fixed mount for focusing, a compensating lens, a mount for the compensating lens including a plurality of telescoping tubes, and means for causing the tubes to telescope to permit the removal of the fixed mount from the motion picture machine.

7. In an optical system, the combination with a fixed mount adapted to be attached to an apertured wall of a motion picture machine, of an objective adapted to be moved in the fixed mount for focusing, a compensating lens, a mount for the compensating lens comprising a plurality of slidable tubular members, one carrying the compensating lens and another having a sliding engagement with the fixed mount, means for supporting the first mentioned telescoping tube, said means being movably mounted on said fixed mount for positioning the compensating lens with respect to the motion picture machine.

8. In an optical system, the combination with a fixed mount adapted to be attached to an apertured wall of a motion picture machine, of an objective adapted to be moved in the fixed mount for focusing, a compensating lens, a mount for the compensating lens comprising a plurality of telescoping tubes, a support for a telescoping tube slidable axially of the objective, and a lever carried by the fixed mount for sliding the tubular member whereby the tubular member and compensating lens carried thereby may be moved toward the objective to permit the removal of the fixed mount from the motion picture apparatus.

Signed at Rochester, New York, this 30th day of August, 1928.

OTTO WITTEL.